US010395049B2

(12) United States Patent
Singla et al.

(10) Patent No.: US 10,395,049 B2
(45) Date of Patent: Aug. 27, 2019

(54) CONDITIONAL SECURITY INDICATOR SHARING (71) Applicant: HEWLETT PACKARD ENTERPRISE DEVELOPMENT LP, Houston, TX (US)

(72) Inventors: Anurag Singla, Sunnyvale, CA (US); Tomas Sander, Princeton, NJ (US)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 170 days.

(21) Appl. No.: 15/328,024

(22) PCT Filed: Jul. 22, 2014

(86) PCT No.: PCT/US2014/047575
§ 371 (c)(1),
(2) Date: Jan. 21, 2017

(87) PCT Pub. No.: WO2016/014029
PCT Pub. Date: Jan. 28, 2016

(65) Prior Publication Data
US 2017/0169240 A1    Jun. 15, 2017

(51) Int. Cl.
*G06F 21/62* (2013.01)
*H04L 29/06* (2006.01)
*G06F 21/44* (2013.01)
*G06F 21/46* (2013.01)
*G06F 21/50* (2013.01)
*G06F 21/57* (2013.01)

(52) U.S. Cl.
CPC ........ *G06F 21/6218* (2013.01); *G06F 21/445* (2013.01); *G06F 21/46* (2013.01); *G06F 21/50* (2013.01); *G06F 21/577* (2013.01); *H04L 63/1441* (2013.01); *G06F 2221/2115* (2013.01); *G06F 2221/2141* (2013.01); *G06F 2221/2147* (2013.01)

(58) Field of Classification Search
CPC ..... G06F 21/56; H04L 63/14; H04L 63/0263; H04L 63/145
USPC ......................................................... 726/14
See application file for complete search history.

(56) References Cited

U.S. PATENT DOCUMENTS 8,176,078 B1    5/2012  Singer et al.
2007/0244981 A1  10/2007  Malden et al.
(Continued)

OTHER PUBLICATIONS

International Search Report and Written Opinion, International Application No. PCT/US2014/047575, dated Feb. 24, 2015, pp. 1-10, KIPO.
(Continued)

*Primary Examiner* — Brandon S Hoffman
*Assistant Examiner* — Nega Woldemariam (57) ABSTRACT According to an example, conditional security indicator sharing may include analyzing a security indicator that is received from a first entity by a security indicator sharing platform for sharing with a second entity. A determination may be made as to whether to share the security indicator with a third entity based on a condition. In response to a determination that the security indicator is to be shared or not to be shared with the third entity based on the condition, the security indicator may be respectively shared with the third entity, or not shared with the third entity.

16 Claims, 4 Drawing Sheets (56) References Cited

U.S. PATENT DOCUMENTS

| | | |
|---|---|---|
| 2008/0229422 A1 | 9/2008 | Hudis et al. |
| 2010/0077481 A1 | 3/2010 | Polyakov et al. |
| 2010/0281542 A1 | 11/2010 | Stolfo et al. |
| 2012/0110633 A1 | 5/2012 | An et al. |
| 2012/0260340 A1* | 10/2012 | Morris .................... G06F 21/56 726/23 |
| 2014/0007190 A1 | 1/2014 | Alperovitch et al. |

OTHER PUBLICATIONS

Sean Barnum, "Standardizing Cyber Threat Intelligence Information with the Structured Threat Information xXpression (STIX™)," May 30, 2013, pp. 1-20, The MITRE Corporation.
EP Search Report; 14898171.5-1213 I 3172690 PCT/US2014047575; dated Feb. 6, 2018; 9 pages.
Skopik Florian et al, Trustworthy Incident Information Sharing in Social Cyber Defense Alliances, Symposium on Computers and Communications (ISCC) IEEE, Jul. 7, 2013 (7 pages).

* cited by examiner

ANALYZE A SECURITY INDICATOR THAT IS RECEIVED FROM A FIRST ENTITY BY A SECURITY INDICATOR SHARING PLATFORM FOR SHARING WITH A SECOND ENTITY
202

ANALYZE A RULE ASSOCIATED WITH THE FIRST ENTITY, THE SECURITY INDICATOR, THE SECURITY INDICATOR SHARING PLATFORM, AND/OR A THIRD ENTITY THAT IS TO RECEIVE THE SECURITY INDICATOR
204

DETERMINE A CONDITION ASSOCIATED WITH THE RULE BASED ON THE ANALYSIS OF THE RULE
206

DETERMINE WHETHER TO SHARE THE SECURITY INDICATOR WITH THE THIRD ENTITY BASED ON THE CONDITION
208

IN RESPONSE TO A DETERMINATION THAT THE SECURITY INDICATOR IS TO BE SHARED WITH THE THIRD ENTITY BASED ON THE CONDITION, SHARE THE SECURITY INDICATOR WITH THE THIRD ENTITY
210

IN RESPONSE TO A DETERMINATION THAT THE SECURITY INDICATOR IS NOT TO BE SHARED WITH THE THIRD ENTITY BASED ON THE CONDITION, NOT SHARE THE SECURITY INDICATOR WITH THE THIRD ENTITY
212

```
┌─────────────────────────────────────────────────┐
│  DETERMINE A CONDITION ASSOCIATED WITH A SECURITY │
│  INDICATOR THAT IS TO BE SHARED FROM A SECURITY   │
│  INDICATOR SHARING PLATFORM WITH A RECIPIENT ENTITY│
│                       302                         │
└─────────────────────────────────────────────────┘
```

```
┌─────────────────────────────────────────────────┐
│  DETERMINE WHETHER TO SHARE THE SECURITY INDICATOR│
│  WITH THE RECIPIENT ENTITY BASED ON THE CONDITION │
│                       304                         │
└─────────────────────────────────────────────────┘
```

```
┌─────────────────────────────────────────────────┐
│  IN RESPONSE TO A DETERMINATION THAT THE SECURITY │
│  INDICATOR IS TO BE SHARED WITH THE RECIPIENT ENTITY│
│  BASED ON THE CONDITION, SHARE THE SECURITY       │
│  INDICATOR WITH THE RECIPIENT ENTITY              │
│                       306                         │
└─────────────────────────────────────────────────┘
```

```
┌─────────────────────────────────────────────────┐
│  IN RESPONSE TO A DETERMINATION THAT THE SECURITY │
│  INDICATOR IS NOT TO BE SHARED WITH THE RECIPIENT │
│  ENTITY BASED ON THE CONDITION, NOT SHARE THE     │
│  SECURITY INDICATOR WITH THE RECIPIENT ENTITY     │
│                       308                         │
└─────────────────────────────────────────────────┘
```

CONDITIONAL SECURITY INDICATOR SHARING

BACKGROUND

Security indicators typically include any type of specific or non-specific information related to a security threat. For example, a security indicator may include an Internet Protocol (IP) address related to a security threat. According to another example, a security indicator may include specific information related to a particular type of malware, or any non-specific information related to malware generally. A security indicator may also include any type of parameter or attribute that may be tracked with respect to a security threat. Users of security indicator sharing platforms typically share such security indicators with other users in an effort to advise the other users of any security threats, or to gain information related to a security threat from other users.

BRIEF DESCRIPTION OF DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Users of security indicator sharing platforms typically share security indicators with other users in an effort to advise the other users of any security threats, or to gain information related to a security threat from the other users. However, once the security indicators are shared via the security indicator sharing platforms, the original users (i.e., the original sharers) have virtually no control over when the security indicators may be further shared, with which entities the security indicators may be further shared, and how these entities may utilize the security indicators. An entity may include an individual, organization, or any unit that may send or receive the security indicator.

According to examples, a conditional security indicator sharing apparatus and a method for conditional security indicator sharing are disclosed herein. The apparatus and method disclosed herein may generally provide for the definition of policies and rules that determine when a security indicator may be shared, which entities the security indicator may be shared with, and how these entities may utilize the security indicator. Similarly, the policies and rules may determine which communities the security indicator may be shared with, and how these communities may utilize the security indicator. A community may include a plurality of entities. For example, a community may include a plurality of individuals (i.e., entities) in a particular area of interest. A community may include a global community where any entity may join, for example, via subscription. A community may also be a vertical-based community. For example, a vertical-based community may be a healthcare or a financial community. A community may also be a private community with a limited number of selected entities.

For the apparatus and method disclosed herein, the sharing of the security indicator may occur based on temporal, contextual, situational, cardinality, and/or other conditions that are expressible through the policies and rules. Temporal conditions may include conditions related to a security indicator that may remain sensitive for a predetermined amount of time (e.g., one week), with the temporal conditions being removed after the predetermined amount of time. Contextual conditions may include conditions related to the sharing to a security indicator with a limited number of entities that are experiencing a problem (e.g., an attack) related to a particular security indicator. Situational conditions may include conditions related to the sharing to a security indicator with entities in a certain location (e.g., a particular country). Cardinality conditions may include conditions related to sharing of a plurality of the security indicators with an entity that already has a predetermined amount (e.g., number or percentage) of the security indicators.

Sharing of the security indicator on a conditional basis may allow entities to collaborate on common threats as needed. For example, the security indicator may be shared on a conditional basis such that the sharing entity may determine whether to continue sharing the security indicator, whether the entity that is receiving the security indicator is a trusted entity (e.g., an entity that is also experiencing the same type of attack), or a malicious entity (e.g., an entity that may use the security indicator to accelerate an attack), etc. Sharing of the security indicator on a conditional basis may also allow entities to ascertain information on certain threats from other entities that may already have knowledge of such threats. An owner of the security indicator may thus provide access to other entities upon satisfaction of conditions that are based on policies and/or on a need to know basis as described herein. Such control over security indicators may thus facilitate the protection of security indicators from being overshared, for example, with unauthorized entities.

For the apparatus and method disclosed herein, generally an entity may share a security indicator with a security indicator sharing platform. The security indicator sharing platform may share the security indicator with a further entity based upon satisfaction of certain conditions that are based on policies and/or on a need to know basis.

According to an example, a conditional security indicator sharing apparatus may include at least one processor, and a memory storing machine readable instructions that when executed by the at least one processor cause the at least one processor to determine a security indicator that is to be shared from a security indicator sharing platform with a recipient entity (e.g., a third entity as described herein). The security indicator may be provided to the security indicator sharing platform by a sharing entity (e.g., a first entity as described herein) for sharing with an intermediate entity (e.g., a second entity as described herein). The machine readable instructions may further cause the at least one processor to analyze a condition (e.g., the temporal, contextual, situational, cardinality, and/or other conditions as disclosed herein) associated with the sharing of the security indicator, and determine whether to share the security indicator with the recipient entity based on the analysis of the condition.

Figure 1:
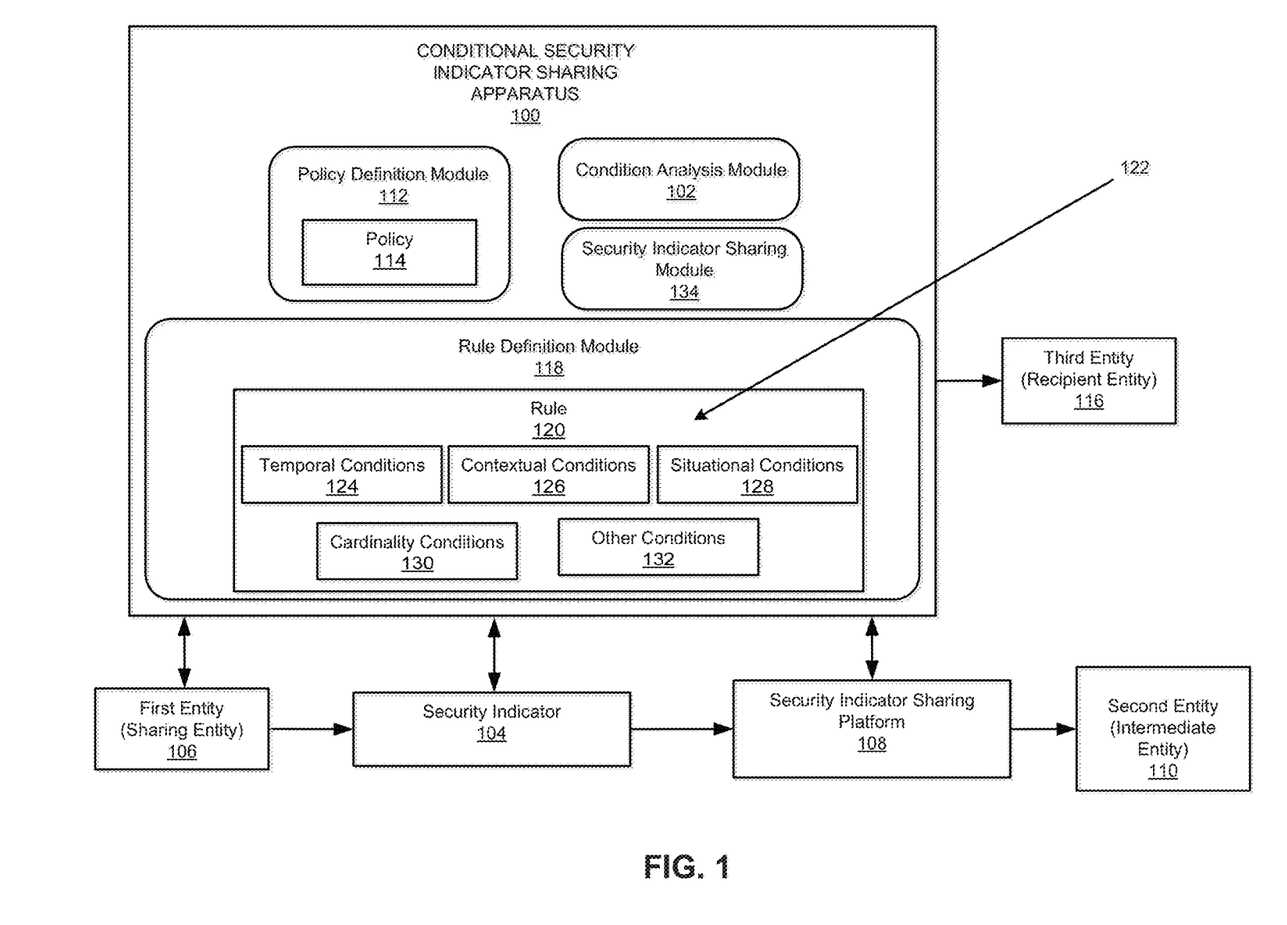
FIG. 1 illustrates an architecture of a conditional security indicator sharing apparatus, according to an example of the present disclosure.

FIG. 1 illustrates an architecture of a conditional security indicator sharing apparatus 100 (hereinafter also referred to as "apparatus 100"), according to an example of the present disclosure. Referring to FIG. 1, the apparatus 100 is depicted as including a condition analysis module 102 to analyze a security indicator 104, which may include a plurality of security indicators, that is received from a first entity 106 (e.g., a sharing entity) by a security indicator sharing platform 108 for sharing with a second entity 110 (e.g., an intermediate entity).

A policy definition module 112 is to define a policy 114 that is related to sharing of the security indicator 104 between the first entity 106 and a third entity 116 (e.g., a recipient entity) via the security indicator sharing platform 108. The policy 114 may include a plurality of policies. The policy 114 may generally include relatively higher level aspects related to sharing of the security indicator 104 (e.g., share the security indicator 104 with all third entities 116 except those on the following list).

A rule definition module 118 is to define a rule 120 associated with the first entity 106, the security indicator 104, the security indicator sharing platform 108, and/or the third entity 116 that is to receive the security indicator 104. The rule 120 may include a plurality of rules. The rule 120 may include more specific implementations of the policy 114 (e.g., share the security indicator 104 with all third entities 116 except those on the following list as long as the following conditions are met).

The security indicator 104 may be shared based on conditions 122 that include temporal conditions 124, contextual conditions 126, situational conditions 128, cardinality conditions 130, and/or other conditions 132 that are expressible through the rule 120.

The condition analysis module 102 may analyze a rule 120 associated with the first entity 106, the security indicator 104, the security indicator sharing platform 108, and/or the third entity 116 that is to receive the security indicator 104. The condition analysis module 102 may determine a condition (e.g., one of the conditions 122) associated with the rule 120 based on the analysis of the rule 120. The condition analysis module 102 may determine whether to share the security indicator 104 with the third entity 116 based on the condition. In response to a determination that the security indicator 104 is to be shared with the third entity 116 based on the condition, a security indicator sharing module 134 is to share the security indicator 104 with the third entity 116. Further, in response to a determination that the security indicator 104 is not to be shared with the third entity 116 based on the condition, the security indicator sharing module 134 is to not share the security indicator 104 with the third entity 116.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

As described herein, the security indicator 104 may be shared based on the conditions 122 that include the temporal conditions 124, the contextual conditions 126, the situational conditions 128, the cardinality conditions 130, and/or the other conditions 132 that are expressible through the rule 120.

Temporal conditions 124 may include conditions related to a security indicator that is to remain sensitive for a predetermined amount of time. For example, a temporal condition may include specification of an amount of time before the security indicator 104 is to be shared with the third entity 116 after being received by the security indicator sharing platform 108, where the amount of time is greater than zero. For example, after expiration of a predetermined time period (e.g., one week), any conditions related to the security indicator 104 may be removed, and the security indicator 104 may be disclosed or made available to all third entities linked to the security indicator sharing platform 108.

Contextual conditions 126 may include conditions related to the sharing of the security indicator 104 with a limited number of entities that are experiencing a problem (e.g., an attack) related to a particular security indicator. For example, a contextual condition may include specification of a parameter for sharing the security indicator 104 with a limited number of entities including the third entity 116. The parameter may be based on a type of attack being experienced by the limited number of entities including the third entity 116. For example, the security indicator 104 may be related to a distributed denial-of-service (DDoS) attack. The security indicator 104 may be shared with a limited number of the third entities 116 that are experiencing a problem (e.g., an attack) related to the DDoS.

A rule 120 that includes a contextual condition 126 may include disclosing the security indicator 104 to everyone (or everyone in submitter's country, set of countries, or verticals), if the submitter's country (e.g., the country of the first entity 106) is under a terrorist attack.

Situational conditions 128 may include conditions related to the sharing to a security indicator with entities in a certain location. For example, a situational condition may include specification of a geographic location related to the third entity 116 for sharing the security indicator 104. For example, the security indicator 104 may be shared with entities in a particular country.

Cardinality conditions 130 may include conditions related to sharing of a plurality of the security indicators with an entity that already has a predetermined amount (e.g., number or percentage) of the security indicators. For example, a cardinality condition may include specification of a predetermined amount of security indicators that have been shared with the third entity 116 before the security indicator 104 is shared with the third entity 116. For example, based on cardinality conditions 130, a plurality (e.g., 1000) of the security indicators 104 may be shared with the third entity 116 that already has a predetermined amount (e.g., 10%) of the security indicators 104. According to another example, with respect to the cardinality conditions 130, the rule 120 may include a cardinality condition that specifies a predetermined number of the third entities 116 that are to have received and/or approved the security indicator 104 before the security indicator 104 is shared with a given third entity 116.

A rule 120 that includes a cardinality condition 130 may include disclosing information to government agencies if the government agencies have access to x % of the security indicators 104 submitted by a participant (e.g., the first entity 106). For example, a third entity 116 that has a malicious intent with respect to the security indicator 104 may be prohibited from gaining access to the security indicator 104 unless it has already received authorized access to a predetermined x % of the security indicators 104.

With respect to the aforementioned conditions, the determination as to enforcement of the conditions may be made at the client-side (i.e., at the site of the first entity 106), by the apparatus 100, and/or at the receiver-side (i.e., at the site of the third entity 116). For example, the first entity 106 may mark the appropriate security indicator 104 with the appropriate policy 114 or rule 120 for application of appropriate conditions.

According to another example, the apparatus 100 (e.g., in conjunction with a server of the security indicator sharing platform 108) may determine which policy 114 or rule 120 to apply to the security indicator 104, without violating any explicit conditions related to the first entity 106 (e.g., client conditions). For example, if a client condition prohibits sharing of the security indicator 104 with a particular competitor (e.g., based on one of the other conditions 132), the apparatus 100 may determine which policy 114 or rule 120 to apply to the security indicator 104, without violating the explicit client condition of sharing with the particular competitor. Such a condition may be designated as a negative condition that includes not sharing the security indicator with the third entity 116.

According to another example, with respect to the other conditions 132, a client may control sharing of the security indicator 104 with any recipient that does not have a particular security level (e.g., clearance, or security infrastructure) related to the security indicator 104. In this regard, the apparatus 100 may determine which policy 114 or rule 120 to apply to the security indicator 104, without violating the explicit client condition of sharing of the security indicator 104 with a recipient that does not have a particular security level.

According to another example, with respect to the other conditions 132, the security indicator sharing platform 108 may perform a matching without explicit knowledge of what is being matched. For example, the first entity 106 may share the security indicator 104 with the third entity 116 if the third entity 116 has been attacked from a given IP address. In this regard, instead of the security indicator 104 including the given IP address, the security indicator 104 may include a hash of the IP address, which may be used by the third entity 116 to determine the IP address. In this manner, the IP address may remain anonymous to the security indicator sharing platform 108. Thus, the security indicator 104 may be shared in a privacy-enhancing manner between the first entity 106 and the third entity 116.

According to another example, with respect to the other conditions 132, the rule 120 may include specific recipient conditions that are to be met to receive the security indicator 104. For example, the third entity 116 may set recipient conditions that are to be met to receive the security indicator 104 from the first entity 106. For example, the third entity 116 may restrict the type of personally identifiable information that is to be received from the first entity 106. In this regard, the rule 120 may include a specific recipient condition to control personally identifiable information in the security indicator 104.

According to another example, with respect to the other conditions 132, the rule 120 may include a condition that creates a block to control certain types of security indicators 104 from being received by the security indicator sharing platform 108 and/or the third entity 116. For example, the rule 120 may include a condition that creates a block to control a business process related security indicator from being received by the security indicator sharing platform 108 and/or the third entity 116.

According to another example, with respect to the other conditions 132, the rule 120 may include a condition that controls a security indicator 104 that is below a certain quality metric from being received by the security indicator sharing platform 108 and/or the third entity 116. For example, the first entity 106 and/or the security indicator 104 may be rated such that the first entity 106 that includes a rating lower than a predetermined threshold does not share the security indicator 104, and/or such a lower rated security indicator 104 is not received by the security indicator sharing platform 108 and/or the third entity 116.

According to another example, with respect to the other conditions 132, the rule 120 may include a condition that specifies a computable attribute related to the third entity 116 that is to be satisfied before the security indicator 104 is shared with the third entity 116.

According to another example, with respect to the other conditions 132, the rule 120 may include a condition that specifies sharing of the security indicator 104 as long as the security indicator 104 is not further shared with another entity. For example, the rule 120 may include a condition that specifies sharing of the security indicator 104 with an organization as long as the security indicator 104 is not further shared with another organization. Such a rule 120 may effectively enforce a contractual agreement between the first entity 106 and the third entity 116.

According to another example, with respect to the other conditions 132, the rule 120 may include a condition that specifies sharing of the security indicator 104 based on a probabilistic criterion. For example, the probabilistic criterion may include a threshold that is related to the probability of an attribute related to the first entity 106, the security indicator 104, the security indicator sharing platform 108, the second entity 110, and/or the third entity 116, where the probability is used to determine when to share the security indicator 104.

According to another example, with respect to the other conditions 132, the rule 120 may include a condition that specifies sharing of the security indicator 104 based on data analytics. For example, sharing of the security indicator 104 may be based on analysis of a set of data. For example, sharing of the security indicator 104 may be based on analysis of historical attack data, where the security indicator 104 is shared if the outcome of the analytics related to the historical attack data matches a predetermined criterion (e.g., whether the security indicator 104 is relevant to the party it would be shared with as that party is likely to be target of the attack associated with this security indicator 104 as well).

According to another example, with respect to the other conditions 132, the rule 120 may include a condition that specifies sharing of the security indicator 104 based on access rights. For example, sharing of the security indicator 104 may be based on a customer's (e.g., the third entity 116) access rights and/or subscription to the apparatus 100 and/or the security indicator sharing platform 108.

In addition to conditional access, certain security indicators 104 may be made available to entities (e.g., third entity 116) on a limited need to know basis. The need to know basis may be orthogonal to the aforementioned conditions 122. For example, once a condition is satisfied, the security indicators 104 may be made available to those entities (e.g., third entity 116) that have a need, as opposed to all entities that meet a condition). For example, particular information may be allowed to be automatically (i.e., without human intervention) made available to any member of the financial community if they are under a DDoS attack. This may provide for the dissemination of certain security indicators 104 to selective participants (e.g., third entities 116), based on certain conditions being satisfied. This may also prevent certain rogue members of a community from obtaining access to all the security indicators 104 as they may not have a valid need to know. During sharing of the security indicators 104, when the security indicators 104 are shared, privacy and other policies are to be honored.

Figure 2:
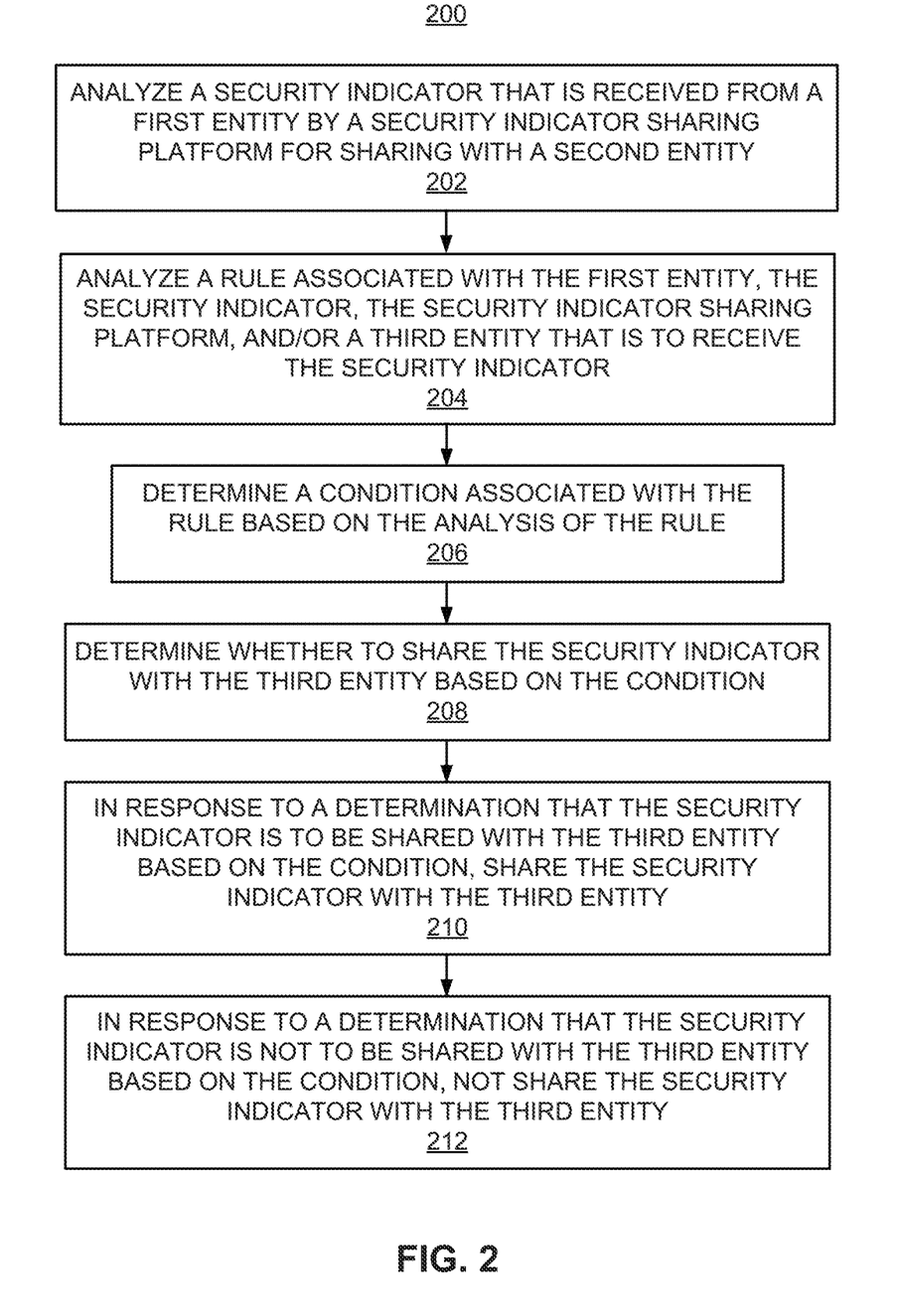
FIG. 2 illustrates a method for conditional security indicator sharing, according to an example of the present disclosure.
Figure 3:
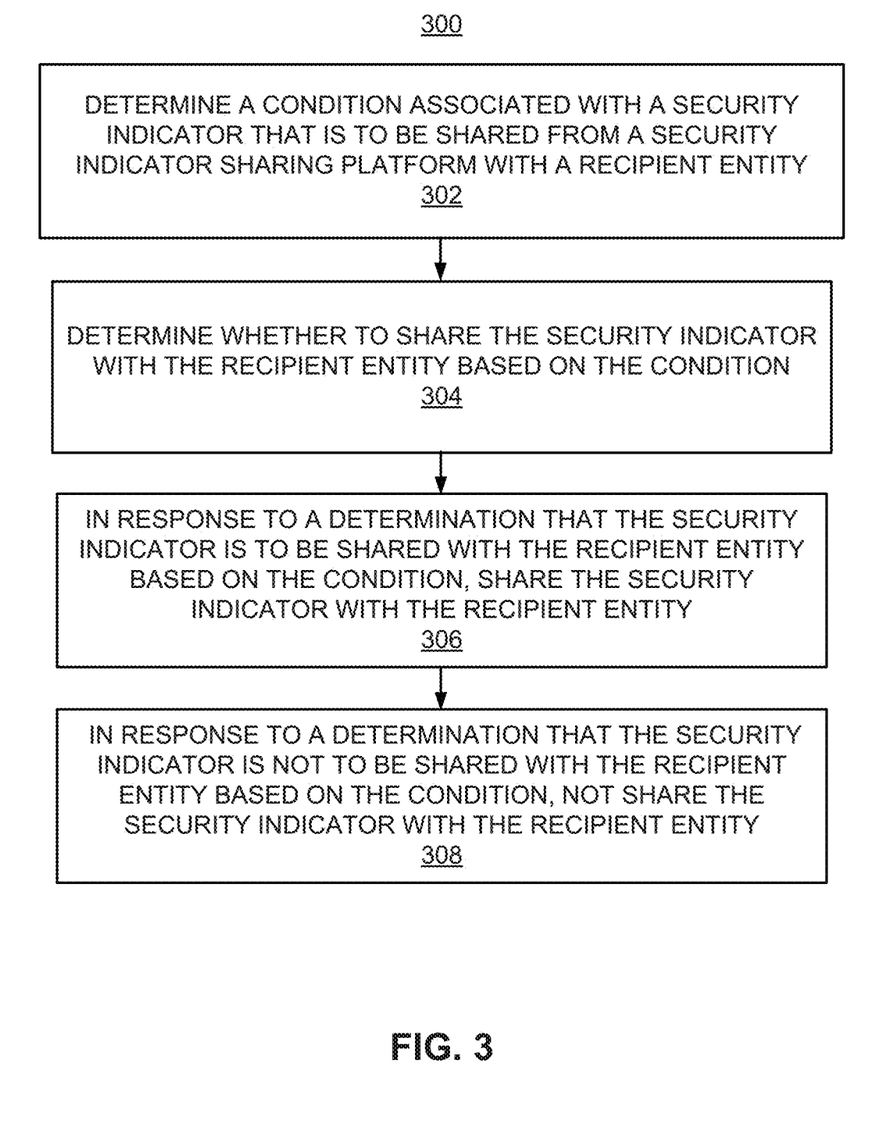
FIG. 3 illustrates further details of the method for conditional security indicator sharing, according to an example of the present disclosure.

FIGS. 2 and 3 respectively illustrate flowcharts of methods 200 and 300 for conditional security indicator sharing, corresponding to the example of the conditional security indicator sharing apparatus 100 whose construction is described in detail above. The methods 200 and 300 may be implemented on the conditional security indicator sharing apparatus 100 with reference to FIG. 1 by way of example and not limitation. The methods 200 and 300 may be practiced in other apparatus.

Referring to FIG. 2, for the method 200, at block 202, the method may include analyzing a security indicator that is received from a first entity by a security indicator sharing platform for sharing with a second entity. For example, referring to FIG. 1, the condition analysis module 102 may analyze the security indicator 104 that is received from the first entity 106 (e.g., a sharing entity) by the security indicator sharing platform 108 for sharing with the second entity 110 (e.g., an intermediate entity).

At block 204, the method may include analyzing a rule associated with the first entity, the security indicator, the security indicator sharing platform, and/or a third entity that is to receive the security indicator. For example, referring to FIG. 1, the condition analysis module 102 may analyze the rule 120 associated with the first entity 106, the security indicator 104, the security indicator sharing platform 108, and/or the third entity 116 that is to receive the security indicator 104.

At block 206, the method may include determining a condition associated with the rule based on the analysis of the rule. For example, referring to FIG. 1, the condition analysis module 102 may determine a condition (e.g., one of the conditions 122) associated with the rule 120 based on the analysis of the rule 120.

At block 208, the method may include determining whether to share the security indicator with the third entity based on the condition. For example, referring to FIG. 1, the condition analysis module 102 may determine whether to share the security indicator 104 with the third entity 116 based on the condition.

In response to a determination that the security indicator is to be shared with the third entity based on the condition, at block 210, the method may include sharing the security indicator with the third entity. For example, referring to FIG. 1, in response to a determination that the security indicator 104 is to be shared with the third entity 116 based on the condition, the security indicator sharing module 134 may share the security indicator 104 with the third entity 116.

In response to a determination that the security indicator is not to be shared with the third entity based on the condition, at block 212, the method may include not sharing the security indicator with the third entity. For example, referring to FIG. 1, in response to a determination that the security indicator 104 is not to be shared with the third entity 116 based on the condition, the security indicator sharing module 134 may not share the security indicator 104 with the third entity 116.

The method 200 may further include determining whether the condition associated with the rule is a condition implemented by the first entity 106, by the security indicator sharing platform 108, or by the third entity 116. In response to a determination that the condition associated with the rule is a condition implemented by the first entity 106, the method 200 may include implementing the condition as specified by the first entity 106 (e.g., by using the condition analysis module 102). In response to a determination that the condition associated with the rule is a condition implemented by the security indicator sharing platform 108, the method 200 may include implementing the condition as specified by the security indicator sharing platform 108 (e.g., by using the condition analysis module 102). In response to a determination that the condition associated with the rule is a condition implemented by the third entity 116, the method 200 may include implementing the condition as specified by the third entity 116 (e.g., by using the condition analysis module 102).

Referring to FIG. 3, for the method 300, at block 302, the method may include determining a condition associated with a security indicator that is to be shared from a security indicator sharing platform with a recipient entity, where the security indicator is shared by a sharing entity with the security indicator sharing platform for sharing with an intermediate entity. For example, referring to FIG. 1, the condition analysis module 102 may determine a condition (e.g., one of the conditions 122) associated with the security indicator 104 that is to be shared from the security indicator sharing platform 108 with a recipient entity (e.g., the third entity 116), where the security indicator 104 is shared by a sharing entity (e.g., the first entity 106) with the security indicator sharing platform 108 for sharing with the intermediate entity (e.g., the second entity 110).

At block 304, the method may include determining whether to share the security indicator with the recipient entity based on the condition. For example, referring to FIG. 1, the condition analysis module 102 may determine whether to share the security indicator 104 with the recipient entity based on the condition.

In response to a determination that the security indicator is to be shared with the recipient entity based on the condition, at block 306, the method may include sharing the security indicator with the recipient entity. For example, referring to FIG. 1, in response to a determination that the security indicator 104 is to be shared with the recipient entity (e.g., the third entity 116) based on the condition, the security indicator sharing module 134 may share the security indicator 104 with the recipient entity.

In response to a determination that the security indicator is not to be shared with the recipient entity based on the condition, at block 308, the method may include not sharing the security indicator with the recipient entity. For example, referring to FIG. 1, in response to a determination that the security indicator 104 is not to be shared with the recipient entity (e.g., the third entity 116) based on the condition, the security indicator sharing module 134 may not share the security indicator 104 with the recipient entity.

Figure 4:
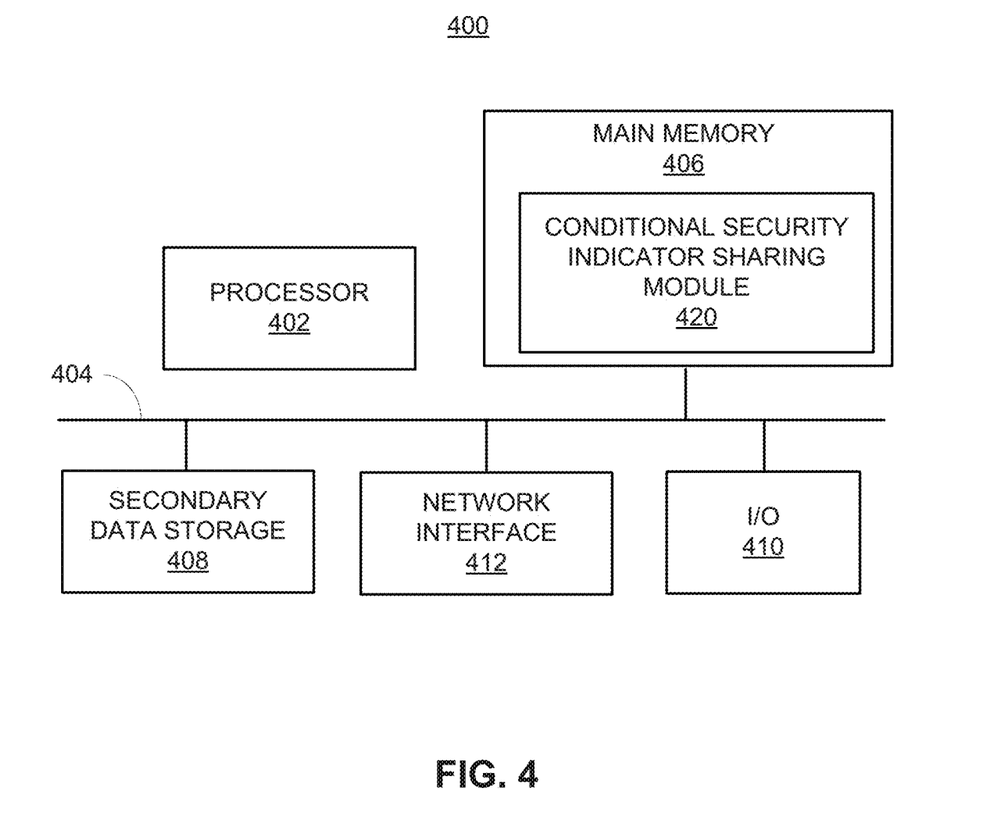
FIG. 4 illustrates a computer system, according to an example of the present disclosure.

FIG. 4 shows a computer system 400 that may be used with the examples described herein. The computer system 400 may represent a generic platform that includes components that may be in a server or another computer system. The computer system 400 may be used as a platform for the apparatus 100. The computer system 400 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 400 may include a processor 402 that may implement or execute machine readable instructions performing some or all of the methods, functions and other processes described herein. Commands and data from the processor 402 may be communicated over a communication bus 404. The computer system may also include a main memory 406, such as a random access memory (RAM), where the machine readable instructions and data for the processor 402 may reside during runtime, and a secondary data storage 408, which may be non-volatile and stores machine readable instructions and data. The memory and data storage are examples of computer readable mediums. The main memory 406 may include a conditional security indicator sharing module 420 including machine readable instructions residing in the main memory 406 during runtime and executed by the processor 402. The conditional security indicator sharing module 420 may include the modules of the apparatus 100 shown in FIG. 1.

The computer system 400 may include an I/O device 410, such as a keyboard, a mouse, a display, etc. The computer system may include a network interface 412 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A non-transitory computer readable medium comprising instructions that when executed cause a system to:
   receive a security indicator from a first entity by a sharing platform for sharing with a second entity;
   analyze a rule;
   determine a cardinality condition associated with the rule based on the analysis of the rule, the cardinality condition specifying that the security indicator is to be shared with an entity that is experiencing a specified type of attack and that already has a predetermined amount of security indicators that have been shared with the entity;
   determine whether to share the security indicator with a third entity based on the cardinality condition;
   in response to a determination that the security indicator is to be shared with the third entity based on a determination that the third entity has the predetermined amount of security indicators that have been shared with the third entity, share the security indicator with the third entity as part of a collaboration between the first and third entities in addressing the specified type of attack; and
   in response to a determination that the security indicator is not to be shared with the third entity based on a determination that the third entity does not have the predetermined amount of security indicators that have been shared with the third entity, not share the security indicator with the third entity.

2. The non-transitory computer readable medium of claim 1, wherein the instructions when executed cause the system to further determine a temporal condition based on the analysis of the rule, the temporal condition specifying an amount of time before the security indicator is to be shared with the third entity after being received by the sharing platform, wherein the amount of time is greater than zero, wherein the determination that the security indicator is to be shared with the third entity is further based on the temporal condition.

3. The non-transitory computer readable medium of claim 1, wherein the instructions when executed cause the system to determine a contextual condition based on the analysis of the rule, the contextual condition comprising a parameter specifying that the security indicator is to be shared with a limited number of entities including the third entity, and wherein the determination that the security indicator is to be shared with the third entity is further based on the contextual condition.

4. The non-transitory computer readable medium of claim 3, wherein the parameter is based on the specified type of attack being experienced by the limited number of entities including the third entity.

5. The non-transitory computer readable medium of claim 1, wherein the instructions when executed cause the system to further determine a situational condition based on the analysis of the rule, the situational condition specifying a geographic location related to the third entity for sharing the security indicator, wherein the determination that the security indicator is to be shared with the third entity is further based on the situational condition.

6. The non-transitory computer readable medium of claim 1, wherein the instructions when executed cause the system to further determine a negative condition associated with sharing the security indicator, the negative condition specifying not sharing the security indicator with the third entity if the third entity does not have a predetermined level of security related to the security indicator, and wherein the determination that the security indicator is to be shared with the third entity is further based on the negative condition.

7. The non-transitory computer readable medium of claim 3, wherein the instructions when executed further cause the system to:
   determine whether the contextual condition associated with the rule is a condition implemented by the first entity, by the security indicator sharing platform, or by the third entity;
   in response to a determination that the contextual condition associated with the rule is a condition implemented by the first entity, implement the contextual condition as specified by the first entity;
   in response to a determination that the contextual condition associated with the rule is a condition implemented by the sharing platform, implement the contextual condition as specified by the sharing platform; and
   in response to a determination that the contextual condition associated with the rule is a condition implemented by the third entity, implement the contextual condition as specified by the third entity.

8. The non-transitory computer readable medium of claim 3, wherein the determination that the security indicator is to be shared with the third entity is based on determining that the third entity is experiencing the specified type of attack specified by the contextual condition.

9. An apparatus comprising:
at least one processor; and
a memory storing machine readable instructions that when executed by the at least one processor cause the at least one processor to:
receive a security indicator that is to be shared by a sharing platform with a recipient entity, wherein the security indicator is provided to the sharing platform by a sharing entity for sharing with an intermediate entity;
analyze a contextual condition associated with the sharing of the security indicator, the contextual condition specifying that the security indicator is to be shared with an entity that is experiencing a specified type of attack;
analyze a cardinality condition associated with the sharing of the security indicator, the cardinality condition specifying the security indicator is to be shared with an entity that already has a specified percentage of security indicators submitted by the sharing entity;
determine whether to share the security indicator with the recipient entity based on the analysis of the contextual condition and the cardinality condition; and
in response to a determination that the security indicator is to be shared with the recipient entity based on the contextual condition and based on a determination that the recipient entity has the specified percentage of security indicators submitted by the sharing entity, share the security indicator with the recipient entity as part of a collaboration between the sharing and recipient entities in addressing the specified type of attack.

10. The apparatus of claim 9, wherein the security indicator shared with the recipient entity comprises a hash of a network address.

11. The apparatus of claim 9, wherein the contextual condition is implemented by the recipient entity and controls personally identifiable information related to the security indicator from being received by the recipient entity.

12. The apparatus of claim 9, wherein the instructions when executed by the at least one processor cause the at least one processor to:
determine that the security indicator is not to be shared with the recipient entity based on a determination that the recipient entity does not have the specified percentage of security indicators submitted by the sharing entity.

13. The apparatus of claim 9, wherein the instructions when executed by the at least one processor cause the at least one processor to:
analyze a temporal condition associated with the sharing of the security indicator, the temporal condition specifying an amount of time before the security indicator is to be shared with the recipient entity after being received by the sharing platform, wherein the amount of time is greater than zero.

14. A method performed by a system comprising a hardware processor, comprising:
determining a contextual condition associated with a security indicator that is to be shared by a security indicator sharing platform with a recipient entity, wherein the security indicator is shared by a sharing entity with the security indicator sharing platform for sharing with an intermediate entity, the contextual condition specifying that the security indicator is to be shared with an entity that is experiencing a specified type of attack;
determining a cardinality condition associated with the security indicator, the cardinality condition specifying the security indicator is to be shared with an entity that already has a specified percentage of security indicators submitted by the sharing entity;
determining whether to share the security indicator with the recipient entity based on the contextual condition and the cardinality condition, wherein a determination that the security indicator is to be shared with the recipient entity is based on determining that the recipient entity is experiencing the specified type of attack specified by the security indicator;
in response to the determination that the security indicator is to be shared with the recipient entity based on the contextual condition and based on a determination that the recipient entity has the specified percentage of security indicators submitted by the sharing entity, sharing the security indicator with the recipient entity as part of a collaboration between the sharing and recipient entities in addressing the specified type of attack; and
in response to a determination that the security indicator is not to be shared with the recipient entity based on the contextual condition and based on a determination that the recipient entity does not have the specified percentage of security indicators submitted by the sharing entity, not sharing the security indicator with the recipient entity.

15. The method of claim 14, wherein determining whether the security indicator is to be shared with the recipient entity is further based on a condition that blocks certain types of security indicators from being received by the recipient entity.

16. The method of claim 14, wherein determining whether the security indicator is to be shared with the recipient entity is further based on a condition that controls security indicators that are below a predetermined quality metric from being shared with the recipient entity.

* * * * *